Feb. 19, 1929.                                        1,703,040
I. B. HUMPHREYS ET AL
CLUTCH
Filed Aug. 25, 1925        2 Sheets-Sheet 1
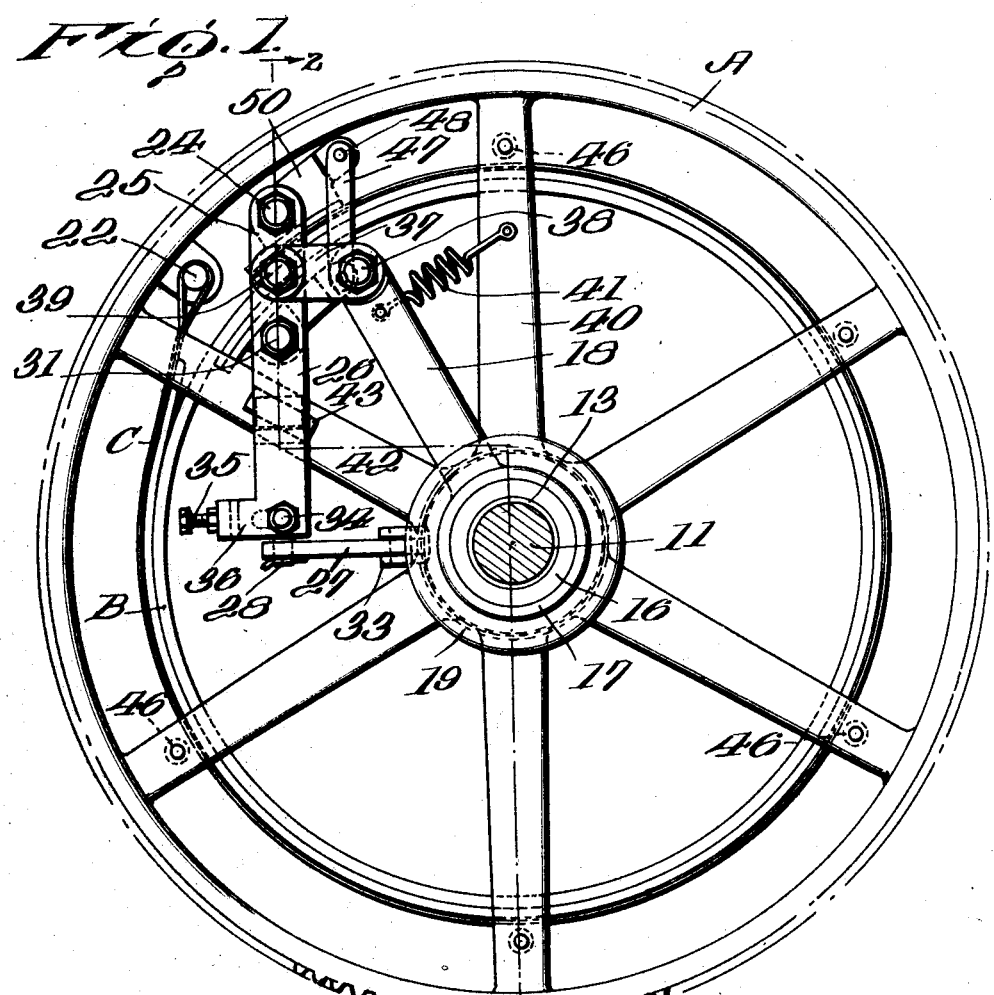
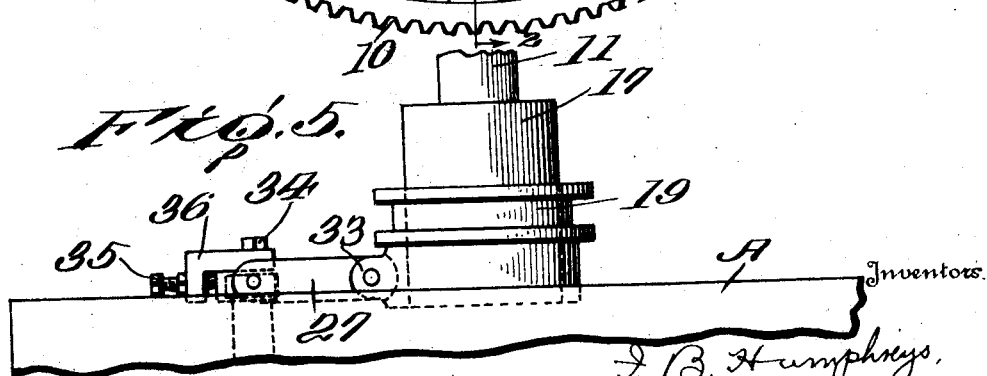

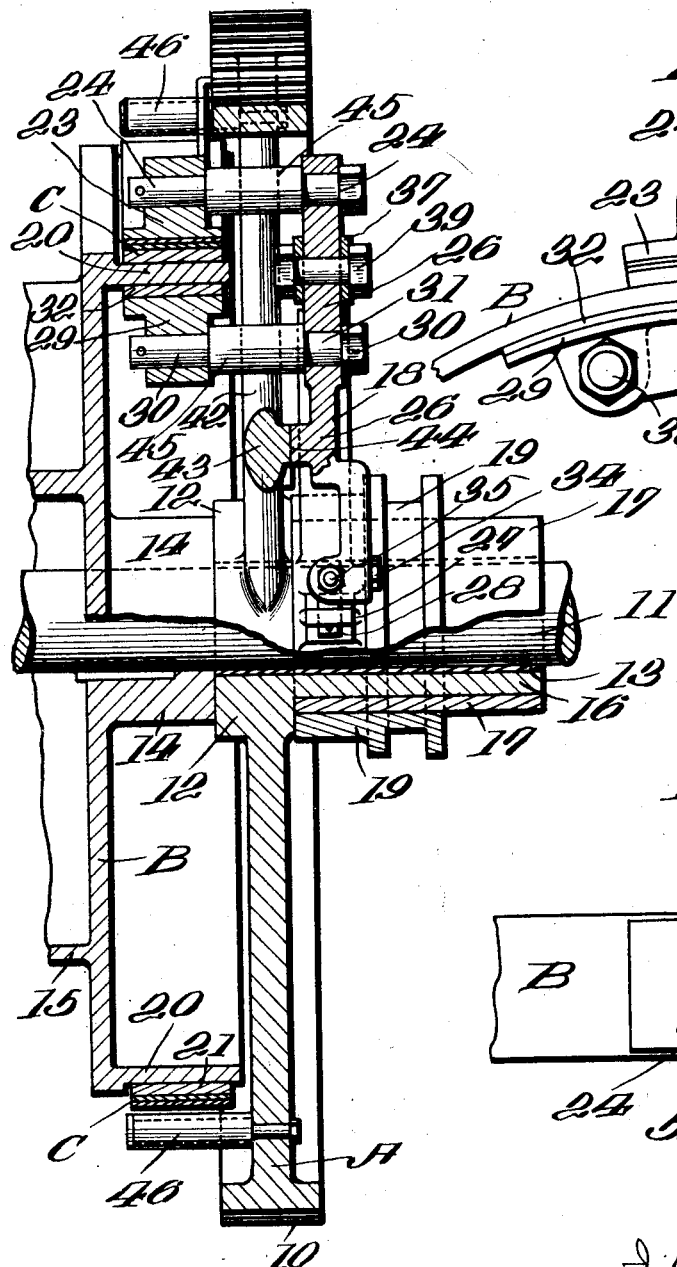
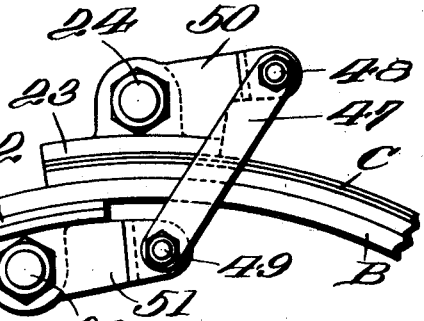
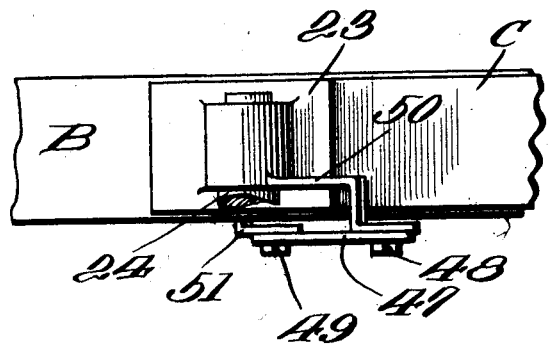

Patented Feb. 19, 1929.

1,703,040

UNITED STATES PATENT OFFICE.

IRA B. HUMPHREYS AND GILBERT H. DENTON, OF DENVER, COLORADO.

CLUTCH.

Application filed August 25, 1925. Serial No. 52,380.

This invention relates to improvements in clutches and pertains more particularly to an improvement in that type of clutch known as the friction clutch.

The object of the invention is the provision of a clutch wherein the lag of the member to be driven tightens the friction clutch band.

Another object of the invention is the simultaneous application of the clutch band and of the clutch band shoes to the member to be driven.

Another object of the present invention is the provision of a friction clutch construction wherein the movement of the operating lever to release the clutch band and clutch band shoes is less than is required to move these members into engagement.

Another and further object of the invention is the provision of a clutch releasing spring in which energy is stored when the clutch mechanism is in engagement with the member to be driven, whereby a smaller movement of the operating lever is required to release the clutch band and its clamping shoes than is required to move these members into engagement, all of which makes it possible to provide a greater leverage for the closing or engaging of the clutch.

A still further object of the invention is the automatic adjustment of the clutch to the wear on the clutch band lining or to the stretching of the clutch band.

Another and further object of the invention is a novel construction of clutch band engaging means whereby holding or clamping pressure upon the member to be driven is applied at both its inner and outer sides.

A still further object of the invention is the provision of a clutch of the character described which is very light in weight in proportion to the clutch duty performed.

A further object of the invention is the provision of a larger arc or surface of contact between the clutch band and the member to be driven whereby high efficiency and uniform wear of the clutch band is accomplished.

A still further object of the invention is the provision of a clutch of the character described which requires no separate adjustments, or take-ups after the clutch mechanism has been once adjusted for duty.

A still further object of the invention is the provision of a friction clutch in which one end of the clutch band is fixed to the driving or power member while the other end is adapted to be clamped to the member to be driven.

Another and further object of the invention is the provision of a friction clutch comprising a driving member and a driven member, the construction being such that the power can be reversed and so that the driven member can be made the driving member and the driving member the driven member.

Another object of the invention is the provision of a construction whereby the simultaneous application of the clutch band and of the clutch band shoes to one of the members is possible.

Other novel features of construction, improved results and advantages of the present invention will appear in the following description and from the accompanying drawings:

In the drawings:

Figure 1 is a view in side elevation of the invention.

Fig. 2 is a vertical sectional view taken at right angles to Fig. 1 on the line 2—2 of Fig. 1, looking in the direction indicated by arrows, a portion of the figure appearing in full lines.

Fig. 3 is a detailed view in side elevation of the clutch band clamping shoes.

Fig. 4 is a top view of the construction shown in Fig. 3.

Fig. 5 is a fragmentary top view showing the sliding collar for engaging and releasing the clutch mechanism and showing the adjustable connection of the clutch mechanism with the operating collar.

Describing the invention in detail, reference being had to the accompanying drawing in which like parts are designated by similar reference numerals throughout the description:

A represents the driving or power member which is rotated in a clock-wise direction. In the embodiment shown this driving member is in the form of a gear wheel having on its outer peripheral edge suitable teeth 10 or the like by which engagement is had with the wheel for rotating it. It will be readily understood that the driving wheel A can be rotated by any common well known means such as a steam or gasoline engine or an electric motor.

The driving wheel A is supported upon the shaft 11 and is free to rotate thereon by reason of the fact that the hub portion 12 of the driving wheel rides on a suitable bushing 13 interposed between it and the shaft. There is also mounted upon the shaft 11 a wheel or drum B which is adapted to be driven by the driving wheel A. The hub 14 of the driven wheel B is made fast to the shaft 11 so as to rotate this shaft. There is also shown on the driven wheel B a drum 15 from which a belt or the like can be driven if desired.

The hub 12 of the driving wheel A is provided with a hub extension portion 16 upon which is loosely mounted the lower end 17 of the supporting arm 18. A sliding collar 19 is loosely mounted upon the lower end of the supporting arm 18.

By reference to the drawings it will be seen that the driven wheel B is smaller in circumference than the driving wheel A and that the wheel B is provided with an outer periperal edge face or drum like portion 20 which is engaged by the friction clutch band C. The clutch band C is of common construction being provided with a lining 21.

One end of the clutch band C is fastened to a suitable stud 22 carried by the driving wheel A while the other end of the clutch band is suitably attached to the outer band shoe 23. The shoe 23 is pivotally supported upon a stub shaft 24 carried by the upper end 25 of the shoe operating lever 26.

The shoe operating lever 26 has its lower end connected to a link 27 by means of the pin 28. The inner clutch shoe 29 is carried upon the stub shaft 30 which is in turn supported as at 31 by the clutch shoe lever 26. The inner clutch shoe is provided with a suitable lining 32 adapted to engage the inner face of the flattened outer face drum like portion 20 of the wheel B.

As stated the lower end of the shoe operating lever 26 has connection with the link 27 which in turn is pivotally connected as at 33 to the sliding collar 19.

Lateral adjustment between the lower end of the clutch shoe operating lever 26 and the sliding collar link 27 is had by means of the clamping nut 34 in its slotted hole together with the set screw 35 carried in the enlarged end portion 36 of the lever 26.

The upper end of the supporting arm 18 pivotally supports one end of the supporting link 37 as at 38 while the opposite end of the supporting link is pivotally connected as at 39 to the shoe operating lever 26 to support the same. Connection is had between the supporting arm 18 and one of the spokes 40 of the driving wheel A by means of a spring 41.

To give the clutch mechanism an added stability and rigidity one of the spokes 42 of the driving wheel A is provided with a protruding portion 43 having a flattened outer face against which the shoe operating lever 26 bears as at 44. A further construction for adding stability to the clutch mechanism are the spacing collars 45 between the shoe operating lever 26 and the outer and inner clutch shoes 23 and 29.

For the purpose of limiting the outward movement of the clutch band C there are provided a plurality of stop rollers 46 carried by the spokes of the driving wheel A and positioned at a point slightly beyond the clutch band.

To assure that the surfaces of the outer and inner clutch shoes 23 and 29, which engage the driven wheel B, are kept parallel when moved there is provided the link 47 which has its ends pivotally attached as at 48 and 49 to the integral bracket extensions 50 and 51, respectively, of the outer and inner shoes 23 and 29.

The clutch shoes can be reset, whenever it is necessary, to assure an equal pressure on both the inside and outside of the wheel B. This is possible by loosening the nut on the pivot 38 which will permit the movement of the links supporting the shoes so that they can be properly positioned to apply an equal pressure on the inner and outer sides of the wheel B. When the nut 38 is loosened the shoes can be moved upwardly and downwardly, as desired, on their pivotal supporting stub shafts 24 and 30. When the shoes are properly adjusted the pivotal support 38 can be tightened into place.

Operation.

Referring to Figures 1 and 2 of the drawings it will be seen that the clutch mechanism is in an engaged position and that the driving or power wheel A is rotating in a clock-wise direction and by reason of the engagement of the friction band C with the driven wheel or drum B this drum is likewise rotating in a clock-wise direction.

To release the clutch mechanism the sliding collar 19 is moved in a direction along the floating hub portion 17 away from the driving wheel hub 12. This is accomplished by engaging the sliding collar 19 with any suitable and well known lever mechanism.

The movement of the sliding collar in a direction away from the hub 12 carries with it the clutch operating link 27 as this member is pivotally connected at 33 to the sliding collar. The clutch operating link 27 by reason of its connection to the pin 28 of the clutch operating lever 26 will move the lower end of this lever towards the shaft 11, the clutch operating lever rotating upon its pivotal connection with the supporting link 37 of the supporting arm 18. Upon the movement of the lower end of the clutch operating lever 26 towards the shaft 11 the upper end of this lever will move in a direction away from the shaft 11 and thereby move the outer and inner shoes 23 and 29 out of engagement with the driven wheel B.

As the clutch pressure is released through the shoes 23 and 29 the spring 41, which is under tension, will pull the supporting arm 18 on its floating hub portion 17 in a clock-wise direction about the shaft 11. The movement of the supporting arm will carry the entire mechanism hereinafter specifically mentioned with it by reason of the connecting and supporting link 37 of this arm. As readily appears the supporting link 37 is connected to the clutch operating lever 26 and the clutch operating lever 26 is in turn connected through the pin 28 and link 27 to the sliding collar 19. It will therefore be seen that the clock-wise movement of the supporting arm 18 will move this entire mechanism in a clock-wise direction. This movement of the entire mechanism, upon the release of the clutch shoes, is brought about by the action of the releasing spring 41.

By reason of the connection of the clutch band C to the outer clutch shoe 23 the clock-wise rotation of the clutch mechanism including the shoes will push or move the clutch band out of engagement with the portion 20 of the driven wheel B. The outward movement of the clutch band is limited by the stop rollers 46 which in addition to limiting the outward movement of the band keep the space between the band and the driven wheel B uniform throughout the length of the band and the periphery of the driven wheel. It will therefore be seen that the clock-wise movement of the clutch mechanism when released enlarges the circle of the clutch band and releases the band throughout its length.

Attention is directed to the fact that the engaging faces or portions of the inner and outer clutch shoes which engage the driven wheel B are maintained in parallel positions by means of the connecting link 47. Maintaining the clutch shoes in parallel position is important for the reason that this will assure an even wear of the clutch band lining on the inner shoe and prevent these shoes from tilting on their stub shaft supports 24 and 30.

Having described the manner in which the clutch mechanism is released the operation of engaging the clutch mechanism will now be described although this is in effect a reversal of the operation which takes place when the clutch mechanism is released.

The releasing spring 41 has been relieved of tension through the releasing of the clutch mechanism and the clutch shoes are of course disengaged from the driven wheel B and the clutch band has assumed an enlarged circle and is out of engagement with the driven wheel B. In describing this operation it will be assumed that the driven wheel B is at rest.

Considering Figures 1 and 2 of the drawings the power or driving wheel A is rotated in a clock-wise direction and the sliding collar 19 is moved along the hub extension in a direction towards the driving or power wheel hub 12. This movement of the sliding collar moves the lower end of the clutch operating lever 26 in a direction away from the shaft 11 by reason of the connecting link 27 between the lower end of the clutch operating lever and the sliding collar 19.

By reason of the fact that the clutch operating lever is pivotally supported at 39 to the supporting link 37 an opposite direction of movement is imparted to the upper end of the clutch operating lever. This movement of the upper end of the lever is in a clock-wise direction and moves the inner and outer clutch shoes into engagement with the inner and outer faces of the drum portion 20 of the driven wheel B.

When these shoes, under pressure, engage the driven wheel B, the link 37 together with its pivotal connection 39 with the clutch operating lever will lag with the driven wheel B until all slack in the clutch band C is taken up and the clutch band is pulled tight on the drum portion 20 of the driven wheel. As soon as the clutch band is taut the driven wheel will rotate with the power wheel A but there will always be a tendency for the driven wheel B to lag.

It will also be readily apparent that when the clutch band is tight the supporting arm 18 by reason of its connection to the link 37 will lag with this link and bring the spring 41 under tension. The total amount of lag of the clutch mechanism is governed by the length of the clutch band and the condition of the clutch band lining.

It will now be seen that the clutch mechanism is in engagement and driving the driven wheel B from the power imparted by the power wheel A. The clutch shoes are gripping the inner and outer faces of the driven wheel B and the clutch band is tightly engaging the outer face of the drum portion 20 of the wheel B throughout its arc of contact.

Throughout the description the invention has been defined as having a driving wheel or member A and a driven wheel or member B.

Attention is directed to the fact that the application of power to the device could be reversed without departing from the spirit of the invention. It will be clearly apparent, from a study of the drawings, that should it be desirable for any reason power could be applied to the drum 15 which would convert the driven wheel B into a driving wheel and would in turn convert the driving wheel A into a driven wheel. Were the mechanism reversed in this manner the direction of rotation would have to be reversed so that the clutch band C would tighten upon the wheel B and would then pull the wheel A through the connection of the clutch band with the wheel A at the point 22.

A conversion of the mechanism in the above described manner would hardly be desirable but it is desired to call attention to the fact that it could be brought about.

It does not seem necessary to describe the operation of the device were it converted as mentioned above. Attention is called however to the fact that with the mechanism converted the lag would still be present which would automatically keep the clutch band tight and prevent the necessity of any adjustment of the clutch band by reason of the wear or the stretching of the band.

In view of the possible conversion of the device claims are appended hereinafter which are intended to cover the mechanism sufficiently broadly to protect it irrespective of which of the members is the driving member.

Having thus described our invention what we claim and desire to secure by Letters Patent is:—

1. In a friction clutch, a driving member and a driven member, a friction band, a rotatably mounted support, a shoe carried by said support and having the opposite end of the friction band attached thereto, a spring connection between the rotatably mounted support and the driving member, means to frictionally engage the shoe with the driven member to cause the friction band to be tightened about the driven member by the lag of the same, and means for disengaging the shoe from the driven member, whereby the spring connection between the rotatably mounted support and the driving member will cause the support and the shoe to move in the direction of rotation of the driving member.

2. In a friction clutch, a driving member and a driven member, a friction band, a friction shoe, a rotatably mounted supporting member for said shoe, one end of the band attached to the driving member and the other end of the band attached to the shoe, means to move the shoe into and out of engagement with the driven member, whereby all adjustments are eliminated by reason of the rotatable supporting member which permits the band to tighten about the driven member to a degree in accordance with the lag of the same.

3. In a friction clutch, a shaft, a driving member rotatably mounted upon said shaft and having an extending hub portion thereto, a driven member carried by said shaft and attached thereto, a friction band, a friction shoe, a supporting member rotatably mounted upon the hub of the driving member and supporting the shoe, one end of the band attached to the driving member and the other end of the band attached to the shoe, means for moving the shoe into and out of engagement with the driven member, and the shoe and its supporting member having a spring connection with the driving member, whereby said spring actuates the shoe and its support throughout a portion of the movement of these members when the shoe is released from the driven member.

4. In a friction clutch, a driving member and a driven member, a friction band, a shoe, one end of said band attached to the driving member and the other end of the band attached to said shoe, a second shoe in parallel relation to the first named shoe, and means for frictionally engaging the two shoes to the driven member, whereby the band is tightened about the driven member by the lag of the same.

5. In a friction clutch, a driving member and a driven member, a friction band, a rotatably mounted support, a pair of shoes carried in separated parallel relation by said support, the friction band having one end attached to the driving member and its other end attached to one of the shoes, and means to move the shoes into frictional engagement with the driven member, whereby the band is tightened about the driven member by the lag of the same.

6. In a friction clutch, a driving member and a driven member, a pair of shoes adapted for frictional engagement with the driven member, a rotatably mounted support, said shoes mounted upon said support, a friction band having one end attached to the driving member and its other end attached to one of the shoes, means to move the shoes into and out of engagement with the driven member, and the shoes and the band adapted for rotation with the driven member.

7. In a friction clutch, a shaft, a driving member rotatably mounted upon said shaft, a driven member carried by said shaft and attached thereto, a friction band, a friction shoe, a supporting member rotatably mounted in respect to the shaft and extending at right angles thereto, said shoe mounted upon said supporting member, one end of the band attached to the driving member and the other end of the band attached to the shoe, means for moving the shoe into and out of engagement with the driven member, and the shoe and its supporting member having a resilient connection with the driving member, whereby said shoe and supporting member rotate with the driving member when the shoe is in a released position and said resilient member actuates the shoe and its supporting member throughout a portion of the movement of these members when the shoe is released from the driven member.

8. In a friction clutch, a driving member and a driven member, a friction band, a friction shoe, one end of said band attached to one member and the other end of the band attached to said shoe, means for frictionally engaging the shoe with the other member to cause the band to tighten about it, and a connection between the shoe and the member to which the band is attached, whereby said last mentioned member and the shoe rotate at all times.

9. In a friction clutch, a shaft, a driving member and a driven member concentrically mounted on said shaft, a shoe, the driven member attached to the shaft to rotate therewith, a friction band having one end attached to the inner side of the driving member and extending around the driven member, the opposite end of the band attached to the shoe, said shoe rotatably supported upon the shaft and adapted to frictionally engage the driven member, and a resilient connection between the driving member and said shoe, for the purpose described.

In testimony whereof we hereunto affix our signatures.

IRA B. HUMPHREYS.
GILBERT H. DENTON.